March 17, 1964  F. A. SCHICK  3,124,867
METHOD OF MACHINING A BEARING CAGE
Filed April 3, 1961  3 Sheets-Sheet 2

Inventor
Frederick A. Schick
by Charles E. Schuck
Attorney

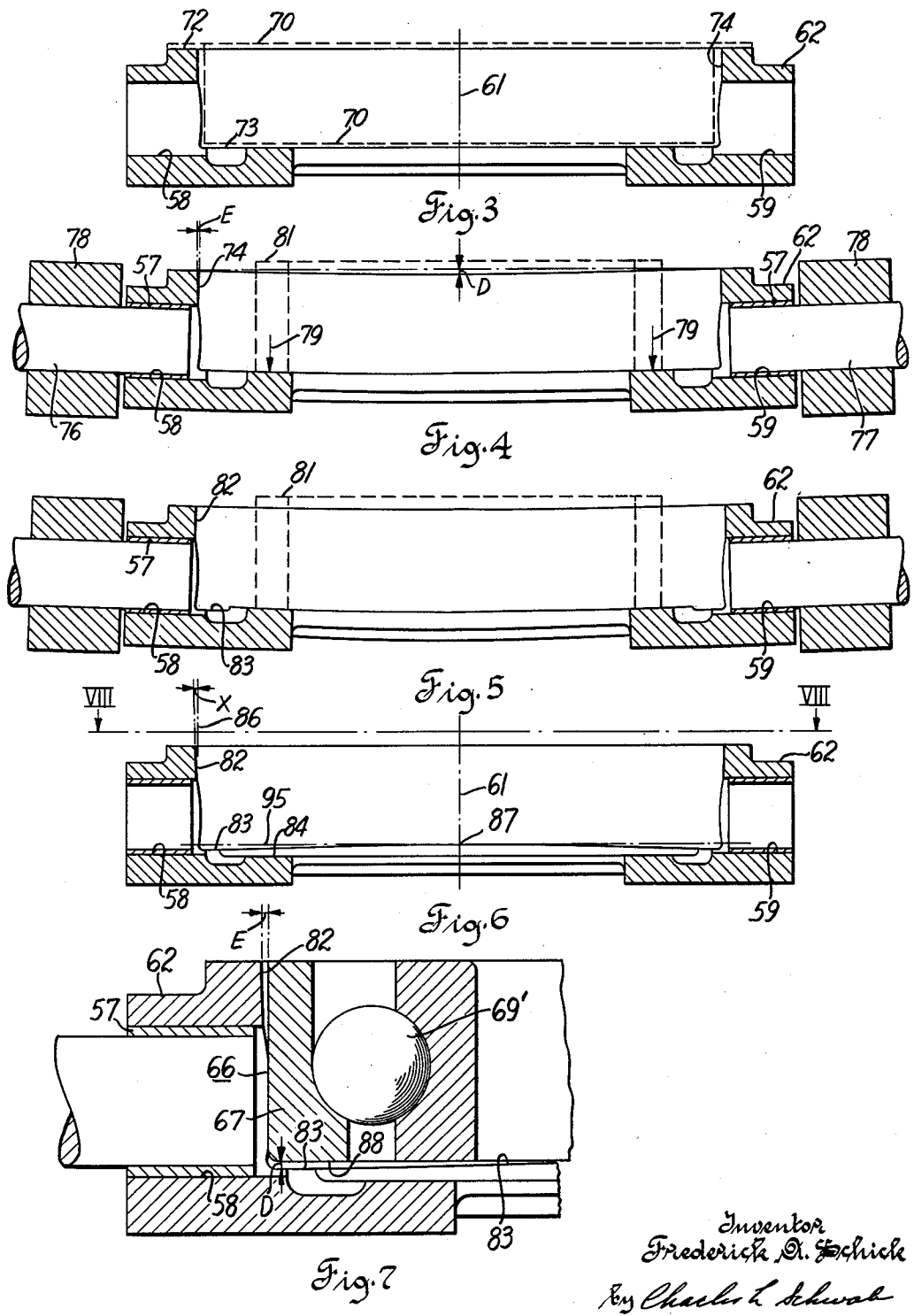

3,124,867
METHOD OF MACHINING A BEARING CAGE
Frederick A. Schick, Springfield, Ill., assignor to Allis-Chalmers Manufacturing Company, Milwaukee, Wis.
Filed Apr. 3, 1961, Ser. No. 100,067
3 Claims. (Cl. 29—148.4)

This invention relates to an improved method of making a bearing cage.

In axial thrust transmitting connections between a pair of relatively rotating members such as between a clutch throwout mechanism and a clutch throwout sleeve, it is common practice to provide an antifriction bearing between the throwout sleeve and the clutch throwout lever or yoke. In the conventional installation the outer raceway of the bearing is held in a nonrotating bearing cage and the inner raceway of the bearing is installed on the rotating clutch throwout sleeve. Axial thrust is applied to the bearing cage through a clutch throwout yoke having a pair of concentric pivot pins which extend into aligned radial holes in diametrically opposite sides of the bearing cage. It has been found in certain clutch installations that the axial thrust transmitted through the bearing cage causes it to deflect to such an extent that the balls of the bearing are subjected to unequal loading and are also pinched through the radially inward deformation of the cage and outer bearing raceway adjacent the pivot pin connections between the cage and the yoke. This difficulty results in a shorter bearing life than is desirable.

It is an object of this invention to take care of the difficulties hereinbefore described in an ecomonical and effective manner.

It is a further object of this invention to manufacture a bearing cage which will not produce uneven loading of the balls of a clutch throwout bearing when the cage is deflected under actual loading conditions.

It is a further object of this invention to manufacture a bearing cage which distributes axial thrust to the outer raceway about its entire annular face.

It is a further object of this invention to provide a new method of manufacturing an improved bearing cage.

These and other objects and advantages of this invention will be apparent when the following description is read in conjunction with the drawings in which:

FIG. 3 is a section view of the cage after it has been partially machined;

FIG. 4 is a section view of the cage subjected to a simulated loaded condition preparatory to further machining;

FIG. 5 is a section view of the cage subjected to loading and showing its condition after machining of the seating surfaces for the outer raceway of the clutch throwout bearing;

FIG. 6 is a section view of the cage showing it in a completely machined condition and not subjected to loading;

FIG. 7 is a section view taken along the line VII—VII of FIG. 2; and

Figure 1:
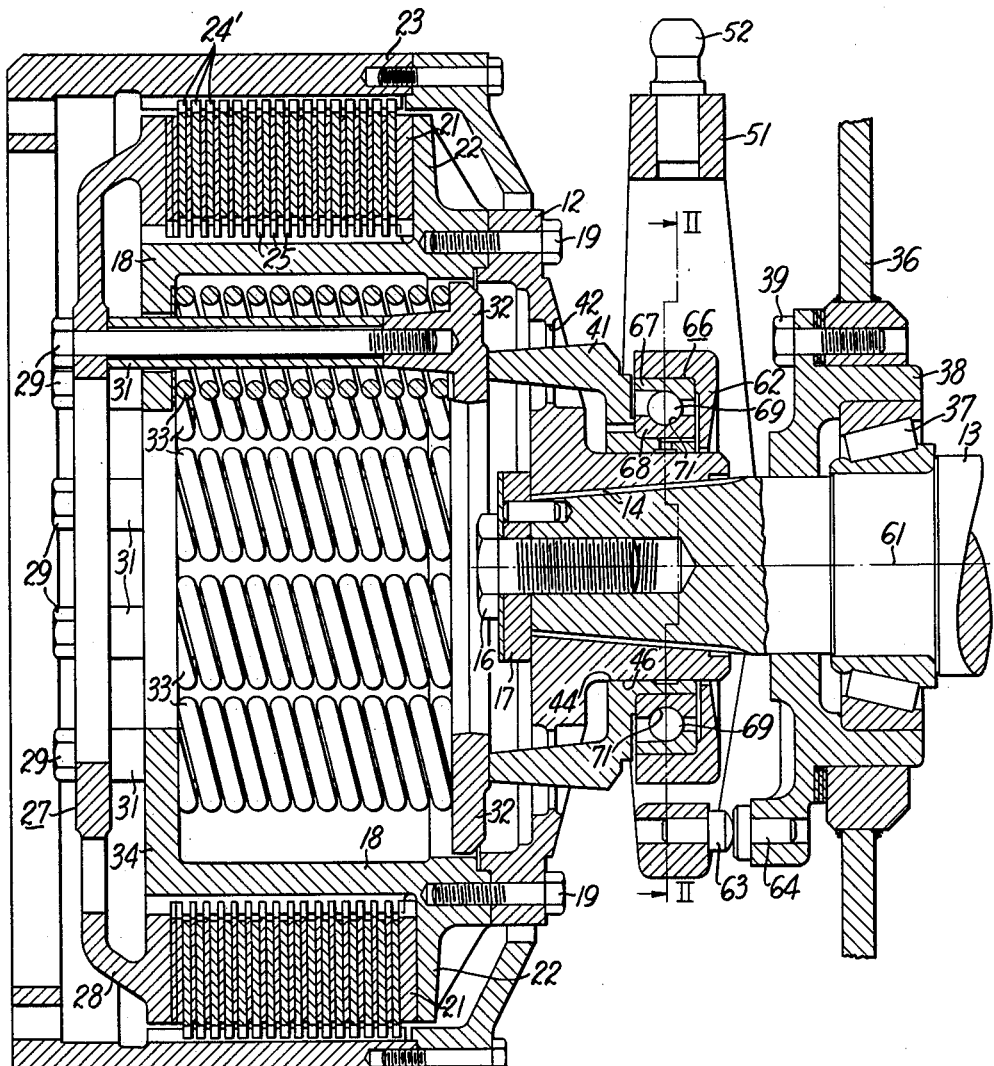
FIG. 1 is a section through a spring loaded friction clutch and a clutch throwout mechanism incorporating this invention.

Referring to FIG. 1 a spring loaded multiple disk clutch assembly 11 has a driving hub 12 secured to a driving shaft 13 through a tapered spine connection 14. A cap screw 16 and washer 17 keep the hub 12 in an installed condition on shaft 13. The driving hub 12 is connected to an externally splined inner drum 18 by a plurality of cap screws 19. The inner drum supports a backing plate 21 which is splined thereto and abuts raradially extending flange portion 22. The clutch assembly 11 includes an outer drum assembly 23 which is internally splined and is connected to an output shaft, not shown. Externally splined clutch disks 24 and internally splined clutch disks 25 are positioned between the drum assemblies 18 and 23 in the conventional manner. The spring loading mechanism 27 includes an axially shiftable pressure plate 28 for engaging disks 24, 25. A plurality of cap screws 29 and spacers 31 secure the pressure plate 28 to throwout plate 32. A plurality of springs 33 are interposed between the clutch throwout plate 32 and the inner drum flange 34.

The shaft 13 is journaled in a wall 36 of a transmission housing by an antifriction bearing 37 mounted in a support 38 which is secured to a transmission housing wall 36 by a plurality of cap screws 39.

A clutch throwout sleeve 41 has a plurality of prongs extending through openings 42 in the driving hub 12 and engaging throwout plate 32. Thus the throwout sleeve rotates with the driving hub 12 and is axially shiftable relative thereto by virtue of its bore 44 having a sliding fit with cylindrical surface 46 of hub 12.

Figure 2:
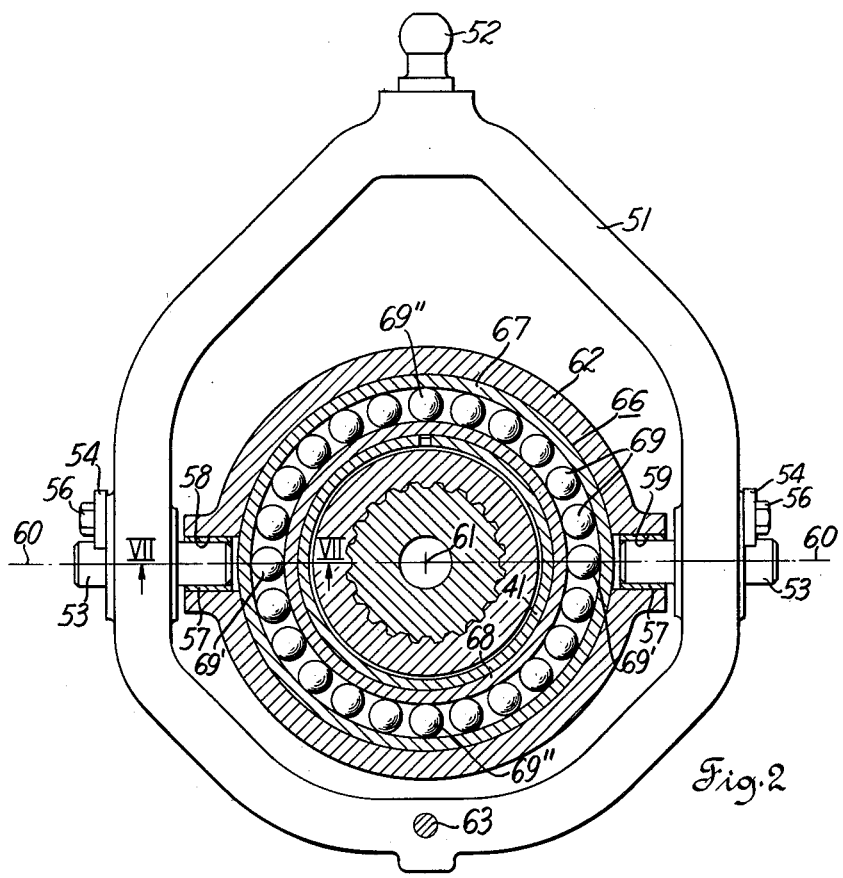
FIG. 2 is a section taken along the lines II—II in FIG. 1.

Referring to FIGS. 1 and 2, a yoke 51 is pivotally connected at diametrically opposite sides of a cage 62 by a pair of pins 53 having a common transverse axis 60. Each pin 53 is grooved to receive a block 54 each of which is secured to the yoke 51 by a cap screw 56. A bushing 57 is press fitted in each of the bores 58, 59 which are formed in diametrically opposite sides of the cage 62. Pins 53 are pivotally installed in the bushings 57. Thus, the yoke 51 and cage 62 are pivotally connected to one another about an axis 60 which intersects with axis 61 of the driving shaft 13. The upper end 52 of the yoke 51 is adapted for connection to a clutch control linkage, not shown. The bottom end of the yoke 51 carries an abutment pin 63 in axially abutting relation to an abutment pin 64 installed on stationary support 38.

A conventional antifriction bearing 66 is interposed between the clutch throwout bearing cage 62 and the clutch throwout sleeve 41. The outer raceway 67 is mounted in the cage 62 and the inner raceway 68 is mounted on the throwout sleeve 41. The bearing 66 includes antifriction bodies in the form of balls 69 interposed between the inner and outer raceways.

When the upper end of the yoke 51 is moved to the left, as viewed in FIG. 1, the springs 33 will be compressed and the multiple disk clutch is disengaged. The yoke 51 transmits axial thrust to the cage 62 through the pins 53 connected at diametrically opposite sides of the cage. Thus the yoke 51 and pins 53 constitute axial thrust transmitting means. Since the cage 62 is made of resilient material such as cast iron, it will deflect under this thrust load thereby applying greater thrust to the balls 69 when they are in a position adjacent to the pins 53. In other words, balls 69' are subjected to a greater axial loading than balls 69". This unequal loading of the balls may be sufficiently great in some installations to result in deterioration of the balls themselves. Additionally the bearing raceways would likewise be subjected to excessive loading. Since the outer raceway is stationary it is subjected to excessive wear in the area adjacent the pins 53. Since the inner raceway is rotating it will be subjected to excessive loading about its entire ball engaging shoulder 71. Each segment of shoulder 71 is subjected to excessive loading when it is rotated to a position adjacent to either of the pins 53. The uneven loading causes a pinching action on the balls due to the cage, at its open end, assuming an elliptical shape wherein the transverse diameter, that is the diameter in the direction of the axis 60, is shorter than the vertical diameter.

Applicant solves the problem hereinbefore described by an ingenious bearing cage and novel method of making same. The improved bearing cage and method of making it will now be described. Referring to FIG. 3, the bearing cage is shown in a partially machined condition. The broken lines 70 represent the bearing cage casting before machining. Radial bores 58 and 59 are finish machined on axis 60. Radially extending surfaces 72, 73 are rough machined at right angles to axis 61. Cylindrical surface 74 is rough machined also.

The bearing cage 62 is next subjected to an axial loading which simulates the actual loading to which it is subjected in operating the clutch. As shown in FIG. 4, the bearing cage is held by a pair of pins 76, 77 which are mounted in a support 78 and have portions extending into bushings 57 which have now been installed in bores 58, 59. The simulated load is applied to the bearing as indicated by arrows 79. For instance, a cylindrical member such as shown by broken line 81 may be suitable for the purpose of transmitting the simulated load to the bearing cage. In this condition it will be noted that the portions of the bearing cage which are 90 degrees from the pins 76, 77 have deflected axially by an amount D. Also, the cylindrical surface 74 has deflected inwardly by an amount E at the portions adjacent the pins 76, 77.

Referring to FIG. 5, the cage 62 is shown under the simulated loading and after finish machining of axially extending cylindrical bearing seating surface 82 and radially extending bearing seating surface 83. In the deflected condition shown in FIG. 5, surface 82 defines a true cylinder and surface 83 is flat and is formed at right angles to the cylindrical surface 82.

Referring to FIG. 6, the cage is shown after the simulated load has been removed therefrom and surface 84 machined therein in the unloaded condition of the cage. It will be noted that in this condition, the substantially cylindrical surface 82 at the open end of the cage and adjacent the bore 58, forms an angle X with relation to a true cylinder, an edge of which is shown by broken line 86. Also it should be noted that surface 83 adjacent the bore 58 lies below a plane 95 at right angles to axis 61 and passing through point 87 on surface 83.

When the clutch throwout bearing 66 is installed as shown in FIG. 7, in an unloaded condition, the outer raceway 67 will not contact the cylindrical surface 82 adjacent the pin at the open end of the cage but rather will be spaced therefrom a slight distance E. The outer raceway 67 will contact point 87 of the bottom surface 83 but will not contact the bottom surface 83 adjacent the bore 58 but rather will be spaced therefrom by an amount D. The seating surface 83 has a two revolution sine wave configuration in axial depth with its two points of greatest depth being adjacent bores 58, 59.

When a cage manufactured as hereinbefore described is installed in a clutch operating mechanism such as the clutch throwout mechanism shown in FIG. 1 and the yoke 51 is moved to the left to disengage the clutch, the cage will be deflected under such load to a position wherein surface 83 becomes coplanar and contacts the outer raceway of bearing 66 about the entire annular surface 88. Also surface 82, instead of pinching the outer raceway, will merely be in light contact therewith.

Figure 8:
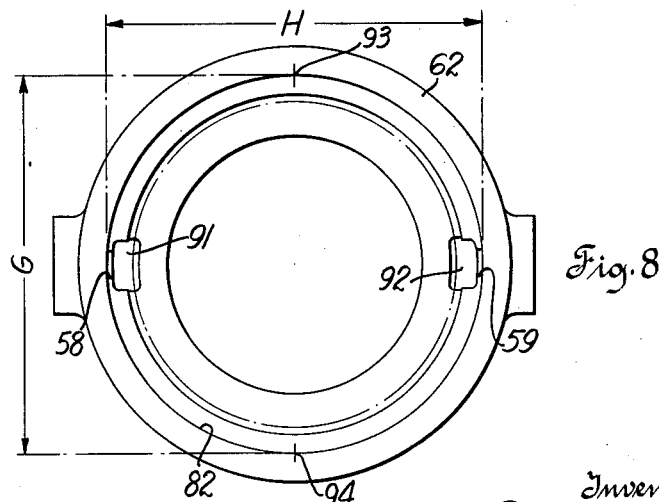
FIG. 8 is a section view of the bearing cage taken along the line VIII—VIII of FIG. 6.

FIG. 8 is a view of the cage looking into the open end thereof along the line VIII—VIII of FIG. 6. This view shows the pockets 91, 92 which are cast into the bearing cage to facilitate machining of the bores 58, 59. Also the surface 82 at the open end of the cage defines an ellipse with a major diameter H and minor diameter G. The outer raceway 67 will be in press fit contact with the cage surface 82 at points 93, 94 when installed therein. The cage 62 may be deflected due to the press fitting of the outer raceway therein, thereby reducing the clearance E illustrated in FIG. 6 from what it would otherwise be.

From the foregoing it is apparent that an extremely novel and ingenious solution to a clutch throwout bearing wear problem has been provided. By utilizing this invention, the life of the bearings for clutch throwout mechanisms are increased markedly.

Although only one embodiment of the present invention is disclosed herein it is not intended to limit this invention except as necessitated by the scope of the appended claims.

What is claimed is:

1. A method of manufacturing a cage for an antifriction bearing of a clutch operating mechanism comprising the steps of: placing a resilient cage under a load simulating the actual load to which it is subjected in operation, and forming a radially extending flat bearing seating surface and an axially extending cylindrical bearing seating surface in said cage for one of the raceways of said antifriction bearing while said cage is subjected to said simulated load.

2. A method of manufacturing a clutch throwout bearing cage comprising the steps of providing a cage of resilient material, partially machining said cage to provide an undersize axially extending bearing surface, subjecting said cage to a load simulating the load to which said cage is subjected in operating a clutch, and machining said cage to form an axially extending cylindrical bearing seating surface and a radially extending flat bearing seating surface at right angles to said cylindrical bearing seating surface while said cage is subjected to said simulated load.

3. A method of manufacturing a clutch throwout bearing cage comprising the steps of providing a cage of resilient material, partially machining said cage to provide an undersize axially extending bearing surface and a pair of aligned radial bores at diametrically opposite portions of said cage, subjecting said cage to a simulated load by holding said cage with pins extending, respectively, into said bores and applying axial thrust to said cage at points spaced radially inward from said bores, and machining a radially extending flat bearing seating surface and an axially extending cylindrical bearing seating surface in said cage while it is subjected to said simulated load.

References Cited in the file of this patent

UNITED STATES PATENTS

| | | |
|---|---|---|
| 2,118,317 | Mader | May 24, 1938 |
| 2,189,956 | Kurzina | Feb. 13, 1940 |
| 2,624,437 | Gardner | Jan. 6, 1953 |
| 2,725,965 | Binder | Dec. 6, 1955 |
| 2,852,836 | McNicoll | Sept. 23, 1958 |
| 2,961,744 | Jagen | Nov. 29, 1960 |